United States Patent Office 3,056,423
Patented Oct. 2, 1962

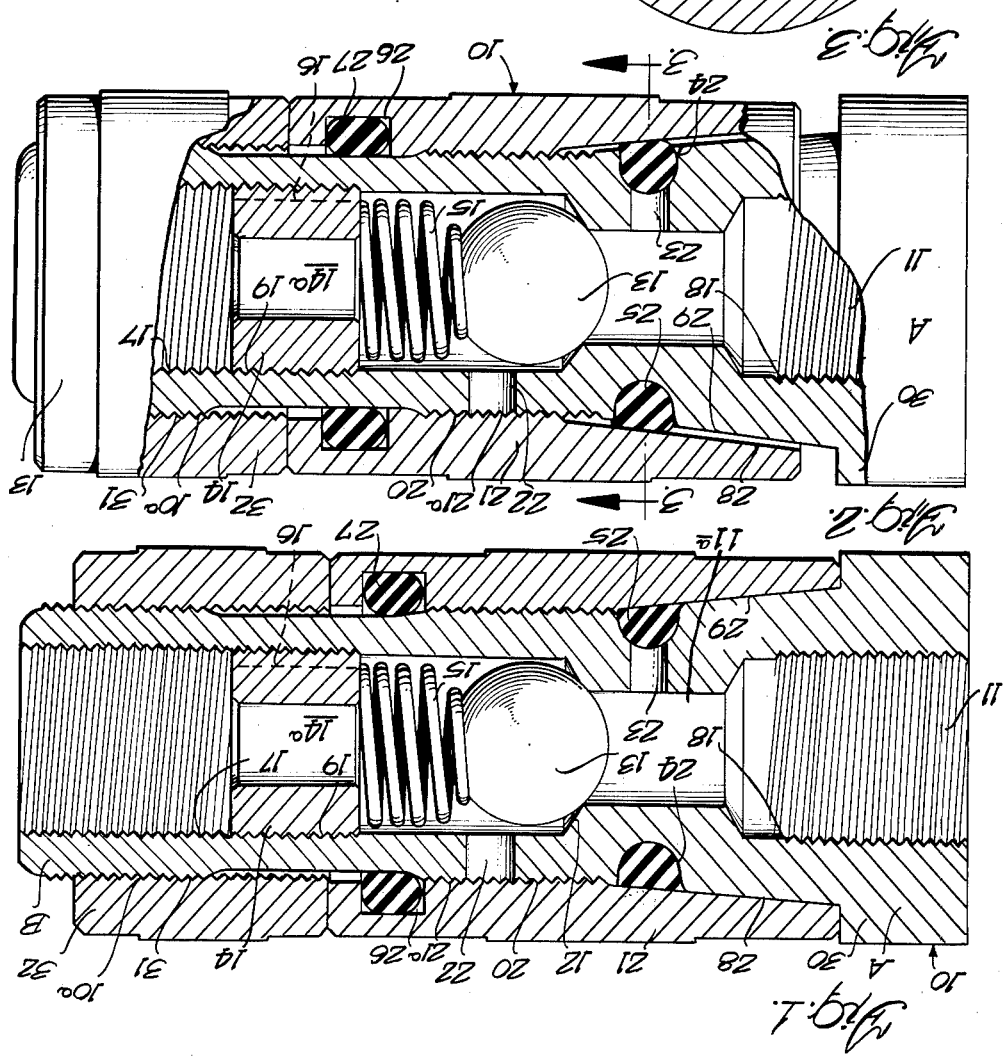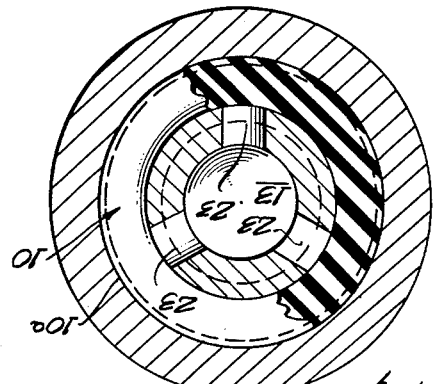

3,056,423
VALVE
Mathias J. Lieser, Chicago, Ill., assignor to Mead Specialties Company, Inc., Chicago, Ill., a corporation of Illinois
Filed Aug. 3, 1959, Ser. No. 831,382
5 Claims. (Cl. 137—493.7)

This invention relates to a flow line valve, and, more particularly, to a valve installable in a flow line adapted to check fluid flow in one direction while yet permitting metered fluid flow in that direction.

In many pressure fluid systems, for example, those in which a work cylinder is employed, there is a need for by-pass of small fluid quantities about a check valve. However, in the past, the valve structures available for this lacked suitable adjustability to accurately control the by-pass quantity. The control adjustment was, in effect, "coarse," with any small manually-induced movement of the control feature resulting in a large volume change. The provision of a control valve overcoming this drawback constitutes an important object of this invention.

Another object is to provide a check valve equipped with a by-pass passage in which the resistance to fluid flow is readily and delicately adjustable. Still another object is to provide a valve of the character just described in which a resilient ring element not only seals parts positioned for movement relative to each other, but also is effective to regulate flow resistance to fluid flow between such parts. Other objects and advantages of this invention can be seen as this specification proceeds.

The invention will be explained in conjunction with an illustrative embodiment, in which—

FIG. 1 is an elevational view, partially in section, of a valve embodying teachings of this invention;

FIG. 2 is a view similar to FIG. 1 but showing the valve parts in different operating condition; and FIG. 3 is a sectional view taken along the line 3—3 of FIG. 2.

In the illustration given, the numeral 10 designates a valve body of generally tubular or cylindrical construction which is equipped with a longitudinally-extending passage 11. Provided in the passage 11 is a valve seat 12, against which a steel ball valve 13 is seen to be seated. The ball valve 13 is confined against movement out of body 10 by a nipple 14 and the valve element 13 is urged against the seat 12 by means of a light coiled spring 15, i.e., having a maximum force of two ounces, the spring being interposed between the nipple 14 and the ball valve 13. The nipple 14 is equipped with a through passage 14a which permits flow of fluid from the end of body 10 designated A to the end designated B when the ball valve element 13 is unseated. The nipple 14 is equipped with a longitudinally-extending slot 16, which provides an alternative path for fluid flowing from end A to end B in the event the passage 14a is closed by virtue of the ball valve element 13 being lodged against it.

The numerals 17 and 18 designate interior threads in passage 11 of body 10 so as to adapt the body for coupling to suitable fluid piping. The threads 17 (positioned at the end designated B) are engaged by the threads 19 of the nipple 14. The body 10 in its outer wall 10a is equipped with threads 20 and engaging these threads is a collar 21 equipped with internal threads 21a.

The numeral 22 designates a radially-extending passage which communicates the passage 11 with the outer wall 10a, this passage 22 being "downstream" of the valve seat 12.

Located "upstream" of the valve seat 12 are a plurality of radially or laterally-extending passages 23 (see FIG. 3), these passages also communicating the longitudinally-extending passage 11 with the outer wall 10a of body 10. In the illustrated embodiment, three passages 23 are shown, these passages being disposed at an angle of 120° relative to each other. The portion of the outer wall 10a with which the passages 23 communicate is equipped with an annular recess 24, in which an O-ring 25 is loosely mounted. Illustrative of the loose mounting is the use of an O-ring having a 7/16 of an inch inner diameter, with the base diameter of the groove being 3/8". As can be seen clearly from FIG. 1, the resilient sealing ring 25 is compressed by the collar 21, the width of the ring being greater than the depth of the recess 24.

The collar 21 is equipped with a recess 26, in which a sealing ring 27 is positioned. The sealing ring 27, like the ring 25, is constructed of a resilient material such as rubber, and serves as a seal against loss of pressure fluid.

The numeral 28 designates an outward taper on the inner wall of collar 21 adjacent the end of the body 10 designated A, while the numeral 29 designates a corresponding taper in the outer body wall 10a. The numeral 30 designates an end flange in body 10 which serves as an abutment for collar 21.

The numeral 31 designates threads in the outer wall 10a of body 10, the threads 31 being spaced toward end B from the threads 20 engaged by the adjustable collar 21. The threads 31 are engaged by an internally threaded locking collar 32 which serves as an abutment against movement of collar 21 in a direction toward end B of body 10.

In the operation of the device just described, the end B of the body 10 may be coupled to a work cylinder (not shown). In many instances, it is desirable to continuously and slowly discharge fluid from such a cylinder. The pressure of the fluid at end B will be effective to seat the ball valve element 13 against seat 12 so as to prevent discharge through the constricted portion 11a of the passage 11. Under such circumstances, however, fluid may travel from end B to end A through a by-pass passage defined by radial passage 22, the threads 20 and 21a, the recess 24, and the radially-extending passages 23. For this purpose, the engagement of the threads 20 of body 10 and the threads 21a of collar 21 is not perfect, as is the case with almost all threads. It is to be appreciated that if greater or less flow is desired, the engagement of the threads can be altered accordingly. However, in any given set of threads 20 and 21a, the resistance to by-pass flow will be established by the number of threads engaged, and this can be altered by moving collar 21 longitudinally of the body 10.

Simultaneously with any such movement to change the flow resistance by increasing or decreasing the number of threads in engagement, a second change in flow resistance is effected by the degree to which the O-ring packing 25 is compressed. This can be appreciated by a comparison of FIGS. 1 and 2.

Movement of the adjustable collar 21 in the direction of end B of the body 10 decreases the number of threads 20 and 21a in engagement, thus decreasing the resistance to by-pass flow. Simultaneously therewith, the O-ring 25 is subjected to less compressive force by virtue of the tapered portion 28 of collar 21 being moved in a direction so as to provide a larger distance between the recess 24 and the collar 21. However, during all of this, the O-ring 25 is still in sealing engagement with the inner wall of the collar 21 so as to provide a seal against loss of fluid between the collar 21 and the outer wall 10a of body 10 in the tapered portion 29 thereof.

While, in the foregoing specification, I have set forth a detailed description of an embodiment of the invention for the purpose of illustration thereof, many changes in the details therein given will be appreciated by those skilled in the art without departing from the spirit and scope of the invention.

I claim:
1. A control valve, comprising an elongated tubular body, a longitudinally-extending passage in said body providing a valve seat, a check valve element in said passage operative to close said passage for engaging said seat, a pair of spaced-apart, laterally-extending passages in said body, one on each side of said seat and communicating said longitudinally-extending passage with the outer wall of said body, a collar mounted on said body in covering relation with said pair of passages, mating threads in said collar and said body outer wall between said pair of passages, a resilient sealing ring between said collar and body and positioned in the path of fluid flow between said pair of passages, said collar adjacent the threaded portion thereof and in the portion thereof contacting said resilient ring being tapered.

2. In a control valve, a tubular body having a longitudinally-extending passage, said body being equipped with a pair of longitudinally spaced-apart, laterally-extending passages opening into the outer wall of said body and communicating with said longitudinally-extending passage, a check valve in said longitudinally-extending passage between said pair of passages, threads in said outer wall between said pair of passages, an annular groove in said outer wall aligned with one of said pair of passages, a resilient sealing ring in said groove, a collar movable on said body and having a threaded interior portion engageable with said outer wall threads, said collar also having an outwardly-tapered portion engageable with said sealing ring, said ring having an inner diameter greater than the base diameter of said groove and an outer diameter sufficient to permit said ring to engage said collar and have said ring compressed thereby.

3. In a control valve, a generally cylindrical metal body having a longitudinally-extending passage, said body having an outer wall outwardly tapered adjacent one end thereof, said outer wall being equipped with a threaded portion adjacent the tapered portion thereof, a radially-extending passage communicating said outer wall in the threaded portion thereof with said longitudinally-extending passage, an annular groove in said outer wall between the threaded and tapered portions thereof, a plurality of radially-extending passages communicating said groove with said longitudinally-extending passage, a check valve in said longitudinally-extending passage between said radially-extending passage and said plurality of radially-extending passages, a loose-fitting resilient sealing ring in said groove, a collar equipped with internal threads movably mounted on said body in engagement with the outer wall threads, said collar also having a tapered portion adjacent the threaded portion thereof and in compressive engagement with said ring, said body outer wall being equipped with a second threaded portion adjacent the first threaded portion but spaced therefrom and on the side thereof remote from said tapered portion, said collar being equipped with an internal annular recess aligned with the portion of said outer wall between the threaded portions, sealing means in said recess, and a locking collar on said second threaded portion.

4. A control valve, comprising an elongated tubular body, a longitudinally-extending passage in said body providing a valve seat, a check valve element in said passage operative to close said passage by engaging said seat, a pair of spaced-apart, laterally-extending passages in said body, one on each side of said seat and communicating said longitudinally-extending passage with the outer wall of said body, a collar mounted on said body in covering relation with said pair of passages, mating threads in said collar and said body outer wall between said pair of passages providing an elongated flow passage operative with said laterally-extending passages to provide a by-pass passage about said check valve seat, a resilient sealing ring between said collar and body and positioned in the path of fluid flow in said by-pass passage, said collar adjacent one side of the threaded portion thereof and in the portion thereof contacting said resilient ring being tapered, and sealing means interposed between said body and collar on the other side of said threaded portion.

5. A control valve comprising an elongated tubular body, a longitudinally-extending passage in said body providing a valve seat, a check valve element in said passage movable in one direction to close said passage by engaging said seat, a pair of spaced-apart, laterally-extending passages in said body, one on each side of said seat and communicating said longitudinally-extending passages with the outer wall of said body, a collar mounted on said body in covering relation with said pair of passages, said collar being movably mounted on said body to provide a space therebetween, said passages and said space providing a bypass passage around said valve seat, an annular groove in the body outer wall in alignment with the one of said pair of passages second in the path of fluid flow in said direction, a resilient sealing ring in said groove, said collar also having an outwardly tapered portion engageable with said sealing ring, said ring having an inner diameter greater than the base diameter of said groove and an outer diameter sufficient to permit said ring to engage said collar and have said ring compressed thereby whereby when said check valve is closed said ring necessarily directs fluid in said space into said one of said pair of passages, and sealing means interposed between said body and collar adjacent the other of said pair of passages and on the side thereof remote from said one of said pair of passages.

References Cited in the file of this patent
UNITED STATES PATENTS

| 1,299,571 | Grounds | Apr. 8, 1919 |
| 1,606,519 | Exten | Nov. 9, 1926 |
| 2,631,000 | Lee | Mar. 10, 1953 |
| 2,713,989 | Bryant | July 26, 1955 |
| 2,924,237 | Ellis | Feb. 9, 1960 |

FOREIGN PATENTS

| 786,419 | Great Britain | of 1957 |